United States Patent [19]
True et al.

[11] Patent Number: 4,802,735
[45] Date of Patent: Feb. 7, 1989

[54] LIGHT VALVE PROJECTOR HAVING AN IMPROVED BAR PLATE CONFIGURATION

[75] Inventors: Thomas T. True, Camillus; William E. Good, Liverpool, both of N.Y.

[73] Assignee: General Electric Company, Philadelphia, Pa.

[21] Appl. No.: 849,990

[22] Filed: Apr. 10, 1986

[51] Int. Cl.⁴ .................... G02B 27/42; G02B 27/00; H04N 9/31
[52] U.S. Cl. ............................ 350/162.12; 350/162.24; 350/167; 358/62
[58] Field of Search ...................... 350/162.11, 162.12, 350/162.17, 162.2, 162.24, 167; 358/62

[56] References Cited
U.S. PATENT DOCUMENTS 3,367,226 2/1968 Vanderlaan ............... 350/167 UX
3,592,529 7/1971 Juhlin ........................ 350/162.17
3,601,470 8/1971 Juhlin ........................ 350/162.24 X

*Primary Examiner*—John K. Corbin
*Assistant Examiner*—David J. Edmondson
*Attorney, Agent, or Firm*—Stephen A. Young; Paul Checkovich

[57] ABSTRACT

A light valve projector of the Schlieren dark field type is provided with an improved input bar plate configuration which achieves greater light efficiencies. The improved input bar plate has orthogonally related rows and columns of slots in which the row slots are spaced between the column slots. Alternating rows of lenslets of a first array divide columns of lenslets of a second array. Light filtering is provided such that one color passes through the row slots and another color passes through the column slots. The output bar plate has a configuration which is complementary to the input bar plate.

4 Claims, 5 Drawing Sheets

LIGHT VALVE PROJECTOR HAVING AN IMPROVED BAR PLATE CONFIGURATION

BACKGROUND OF THE INVENTION

1. Field of the Invention

The present invention generally relates to light valve projectors of the Schieren dark field type exhibiting greater efficiencies than prior art projectors of this type and, more particularly, to an improved light valve bar plate configuration where there is full utilization of the slots which are available in the input and output bar plates. The present invention is a new optical arrangement for light valves which may be described as "intermediate homogenized bars" that leads to much higher light efficiencies.

2. Description of the Prior Art

The general principles and mechanisms of light valve projectors utilizing Schlieren projection lenses are taught, for example, in U.S. Pat. No. 3,437,764 to Good et al. Such systems have been in use for many years and are capable of providing good performance; however, in prior art light projectors, the efficiency of the transmission of light through the input lenticular lens and bar plate is limited to about 75% of that which is possible.

In light valve projector systems, the input bar plate passes filtered light focussed onto the slots of the bar plate by a lenticular lens system composed of arrays of lenslets. The output bar plate blocks or passes light according to whether it has been diffracted by diffraction gratings written in a control layer by an electron beam. The configurations of the input and output bar plates are complementary; that is, opaque areas of the output bar plate are aligned with transparent areas of the input bar plate while transparent areas of the output bar plate are aligned with opaque areas of the input bar plate. The configuration of the input bar plate dictates the configuration of the color filter plate and the lenticular lens system.

Briefly, with reference to FIG. 1, the slots of input bar plate 18 are arranged such that the horizontally oriented slots, referred to as "green slots", are in the center of the plate and the vertically oriented slots, referred to as "magenta (red +blue) slots", are located above and below the green slots. As mentioned, the output bar plate 30 is complementary to the input bar plate; i.e., the opaque bars in plate 30 are aligned with the slots in plate 18. An enlarged view of the prior art input bar plate is shown in FIG. 2 where, for purposes of illustration, a portion of the bar plate 18 is shown broken away to reveal arrays of lenslets 55 of the lenticular lens system 28. In this type of bar plate, half of the potential green lenslets are blocked in order to obtain slot-to-slot spacing which will give good green vertical resolution. As will be observed in FIG. 2, a horizontal slot 51 is aligned with every other row of lenslets and the intervening focussed light from alternating rows of lenslets is blocked by a horizontal bar 50.

The arrangement shown in FIG. 1 is typical for light valve projectors described by Good et al in U.S. Pat. No. 3,437,764, and the invention will be described in terms of this example. It should be understood, however, that the two optical bandpass filters on plate 26 of FIG. 1 may be chosen to transmit other than green and magenta light for special applications. Moreover, the ratios of the colors, e.g. as defined by the green slots and the magenta slots, will vary depending on the chosen light source. For example, in the case of a full color television light projection system with a Xenon light source, it has been found that a ratio of 33% green and 67% magenta pupil area provides good white light balance for the light output of the projector. On the other hand, a system using a multivapor light source may require a ratio of 25% green and 75% magenta pupil area to provide good white light balance. Thus, it will be appreciated that the design details used in the description of the invention are by way of illustration only.

SUMMARY OF THE INVENTION

It is therefore a general object of this invention to provide a light valve projector of the Schlieren dark field type having an improved bar plate configuration that exhibits increased light efficiencies.

It is a more specific object of this invention to provide an arrangement of green and magenta input slots on the input bar plate which will permit full utilization of all of the available lenslets on the lenticular lens system and all available space on the input bar plate.

According to the invention, a light valve projector of the Schlieren dark field type having improved input and corresponding complementary output bar plate systems has an optical input pupil which comprises a lenticular lens system, consisting of interleaved arrays of lenslets, and an input bar plate having orthogonally related rows and columns of slots, in which the row slots are spaced between the column slots. Light filtering is provided such that one color passes through the row slots and another color passes through the column slots. The lenslets aligned with the row slots are displaced with respect to the lenslets aligned with the column slots by a distance of one half the width of the lenslets aligned with the column slots. Since the output bar plate has a configuration which is complementary to that of the input bar plate, light passing through row slots of the input bar plate will be diffracted into the middle of column slots of the output bar plate. This combined with the fact that no additional opaque space is now required between the row slots to obtain the slot-to-slot spacing that provides good vertical resolution provides for the achievement of greater light efficiencies.

In a preferred embodiment, this invention provides an input bar plate slot arrangement wherein rows of slots for accommodating green light are each separated by columns of magenta slots which are perpendicular to the rows of slots. In order to maintain the 33% green and 67% magenta ratio for the specific example using a Xenon light source, the equivalent of two rows of columns of magenta slots are placed between adjacent rows of green slots. A 25% green to 75% magenta ratio is achieved by placing the equivalent of three rows of columns of magenta slots between adjacent rows of green slots.

The invention also provides for offsetting the columns of magenta slots and their aligned lenslets one half of a lenticular space with respect to the lenslets aligned with the rows of green slots. This provides for improved green efficiency because green light passing through the green slots is diffracted into the middle of the adjacent magenta slots in the output bar plate.

This invention also provides for improved uniformity of color of illumination despite vignetting in the Schlieren and projection optics.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
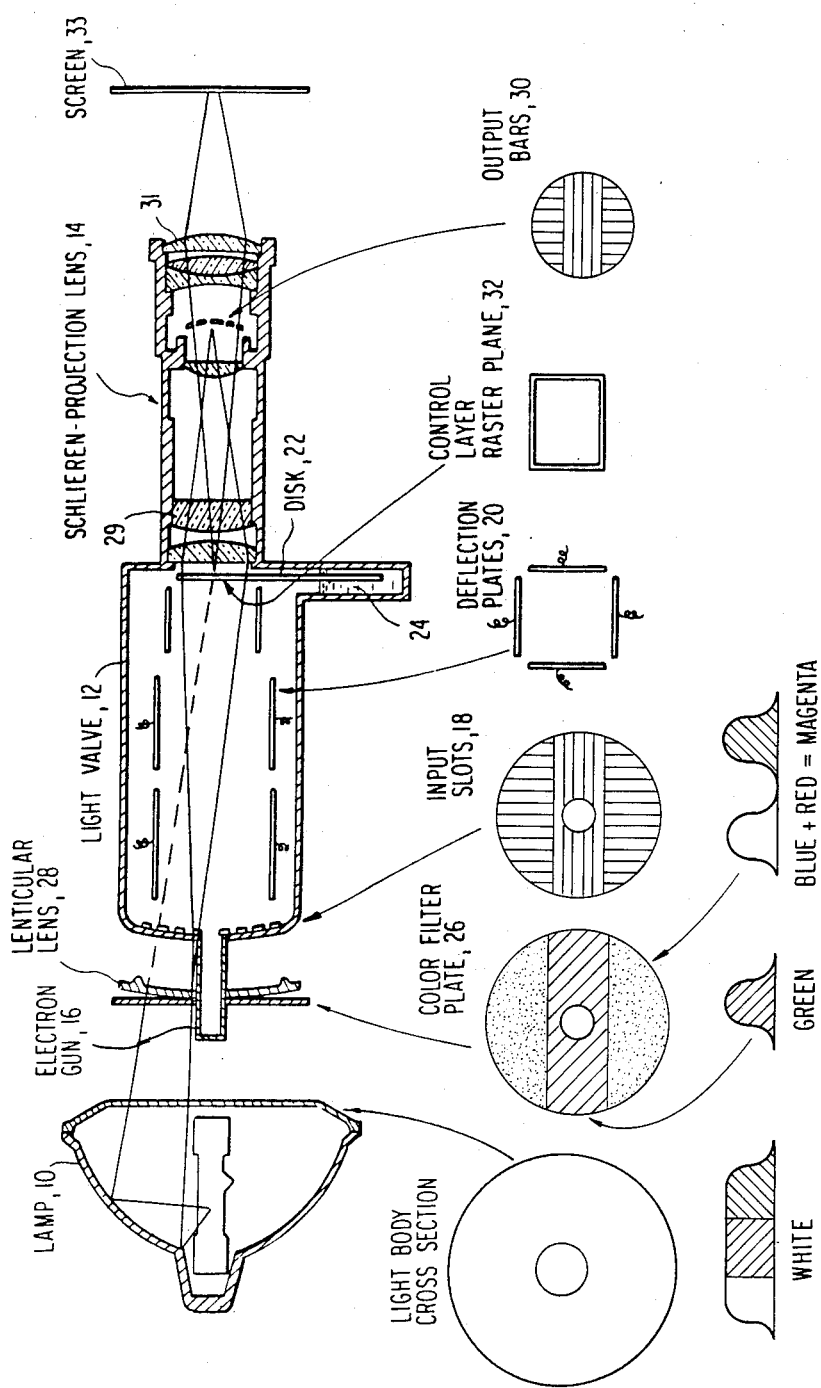
FIG. 1 is a simplified view of a typical prior art light projecting system which includes input and output bar plate slots.
Figure 2:
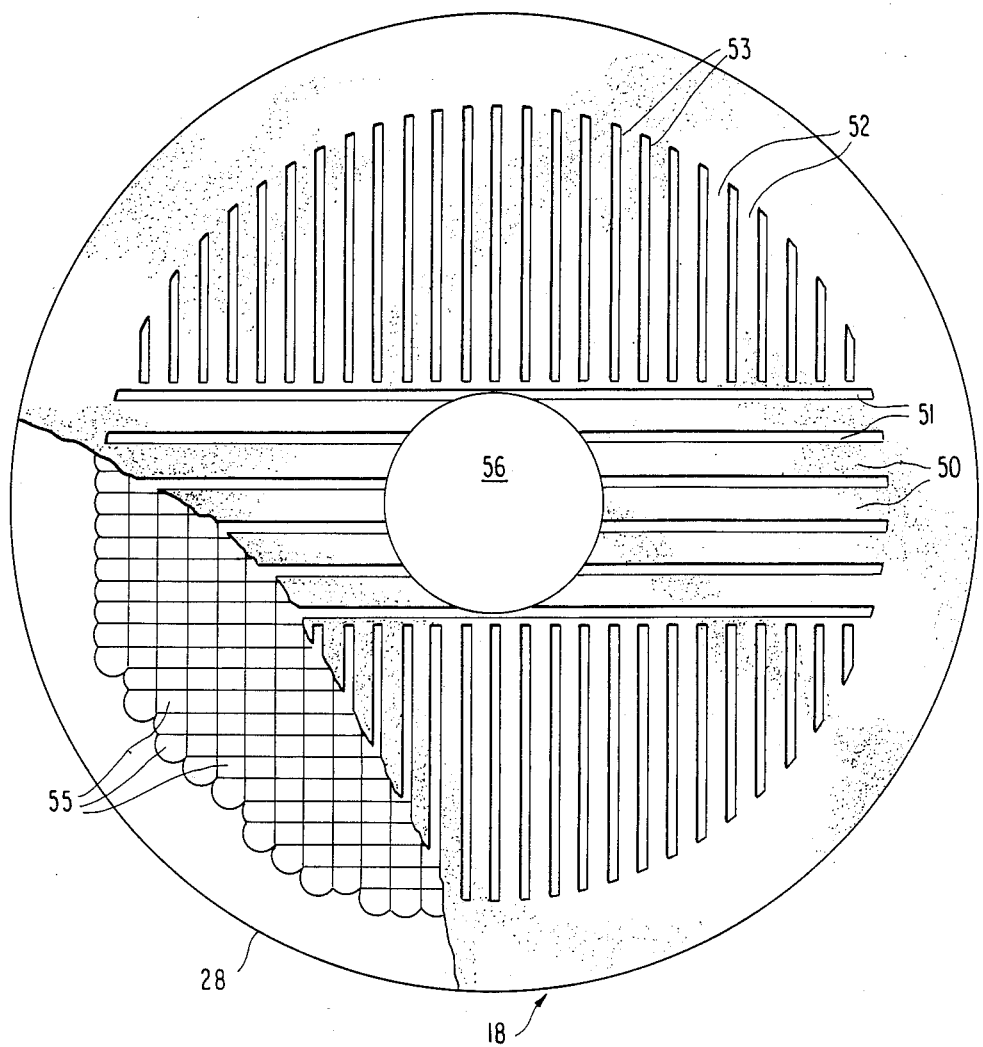
FIG. 2 is an enlarged view of the input bar plate 18 shown in FIG. 1, the input bar plate being partially broken away to reveal the lenslets of the lenticular lens system.

Referring again to FIGS. 1 and 2 of the drawings, there is shown a typical light valve projector which may incorporate this invention. Lamp 10 provides white light received by color filter plate 26 which provides the appropriate green or magenta light to the slots in the input bar plate 18. FIG. 2 shows the input bar plate 18 having bars 50 and 52 and slots 51 and 53. Referring back to FIG. 1, lenticular lens system 28 is composed of a first array of lenslets aligned with the slots 51 and a second array of lenslets aligned with the slots 53. The lenslets in the respective arrays focus the light onto the slots 51 and 53. A control oil layer 32 is provided on a rotating disk 22 as it rotates through a sump or reservoir 24, and information is written on the layer by the electron gun 16 under control of deflection plates 20. A Schlieren projection lens 14 directs the light to the output bar plate 30 which has a complementary configuration of bars for magenta and green as the input bar plate 18. Thus, for example, green light which is diffracted by the diffraction gratings written into the control layer 32 will pass through the horizontal slots in the output bar plate 30, but green light which is not diffracted will be blocked by the horizontal bars in the output bar plate 30, these horizontal bars being aligned with the horizontal slots of the input bar plate 18. A similar analysis may be made for the filtered magenta light which passes through the vertical slots in the input bar plate 18. Thus, if no light is diffracted by the control layer 32, there will be no light output from the light valve projector. This is what is meant by a light valve projector of the Schlieren dark field type.

As shown in FIG. 2, the magenta bars 52 of the input bar plate 18 are interspaced with slots 53 which transmit the light. For purposes of illustration, a portion of the bar input bar plate 18 is broken away in FIG. 2 to expose the lenslets 55 aligned with the slots 51 and 53. The green bars 50 are interspaced with their respective slots 51. There is a central hole 56 in the input bar plate to accomodate the electron gun. The output bar plate 30 is just the complement of the input bar plate 18. That is, in the output bar plate the slots would be aligned with bars 50 and 52, and the bars would be aligned with the slots 51 and 53. Of course, there would be no central hole in the output bar plate. In the input bar plate, the green slots are also separated by a distance necessary to provide sufficient vertical resolution of the green light. Thus, approximately half of the potential light available for green light is blocked and not used.

Figure 3:
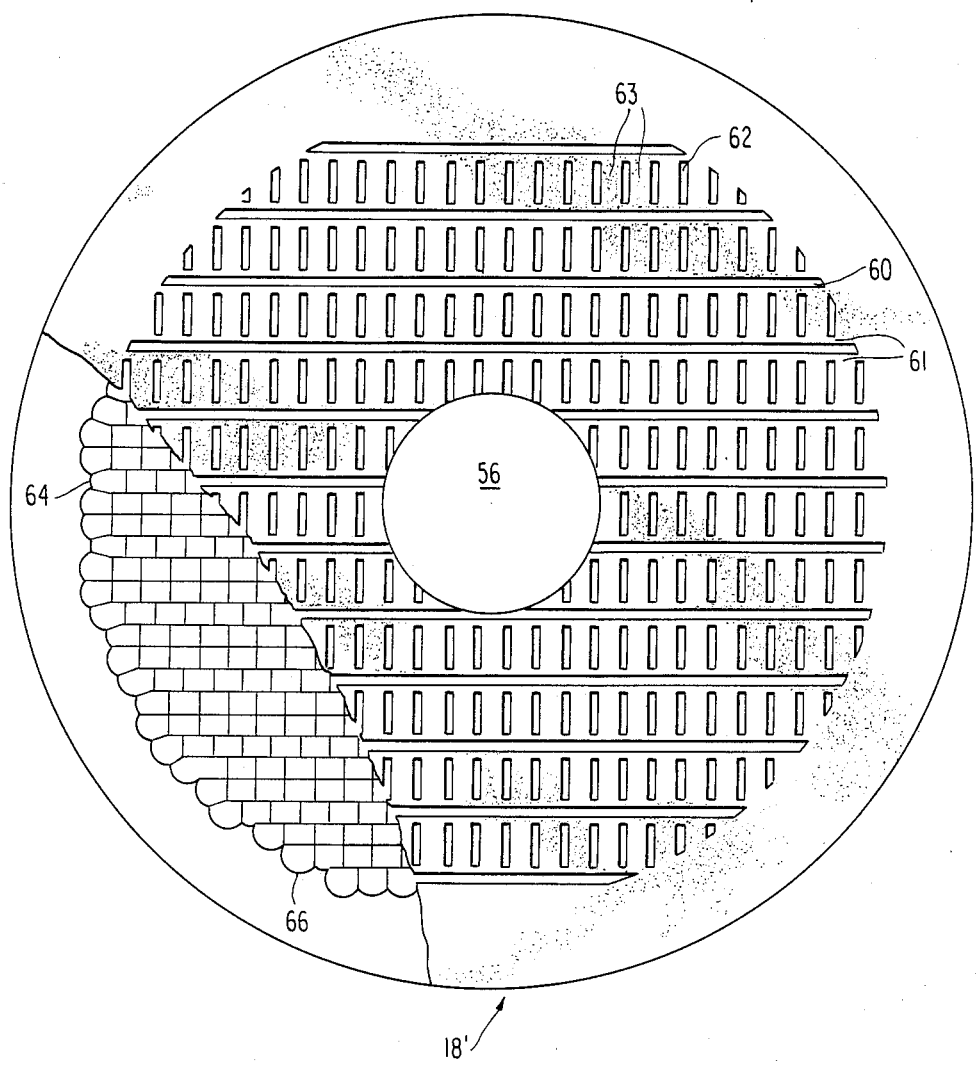
FIG. 3 is an enlarged view of an input bar plate in accordance with this invention which shows green rows of slots which are interspaced with two lenticule high columns of magenta slots, the bar plate again being partially broken away to reveal the lenslets of the lenticular lens system.

The present invention, as shown in FIG. 3, provides for the rearrangement of the input bar plate 18' wherein the green slots 60, and correspondingly aligned first array of lenslets 64, are placed in rows which are each separated by columns of magenta slots 62, and their correspondingly aligned second array of orthogonal lenslets 66. Again, for purposes of illustration, a portion of the new input bar plate 18' is broken away to show the lenslets. In the illustrated embodiment, the columns of magenta bars and slots are two lenslets high, providing the necessary slot-to-slot spacing 71 of the green slots 60 and associated green bars 61, while the horizontal spacing between the magenta bars and slots is one lenslet wide. The green bars 61 are placed so that they are perpendicular to the columns of magenta bars 63. This arrangement may also be described as columns of vertical magenta slots which are separated at every second lenticular lens spacing by single green slots. This particular arrangement provides the 33% green to 67% magenta ratio found to be best for Xenon light sources. Since the lenslets 64, 66 are of equal size a 25% green to 75% magenta ratio is achieved by columns of vertical magenta slots which are separated at every third lenticular lens spacing by single green slots. Other ratios, including a one-to-one ratio, are also possible.

By this arrangement, the wide opaque areas between the green slots in the input bar plate shown in FIG. 2 are eliminated. The green vertical resolution is still maintained because the green slots and their aligned lenslets are separated by a spacing of two or more lenslets. Thus, the magenta bars provide the necessary spacing between the green slots without loss of plate transmission area, which, in the prior art, has been taken up by the necessary wide opaque bars between the green slots. This new optical arrangement may be described as "intermediate homogenized bars".

Figure 3A:
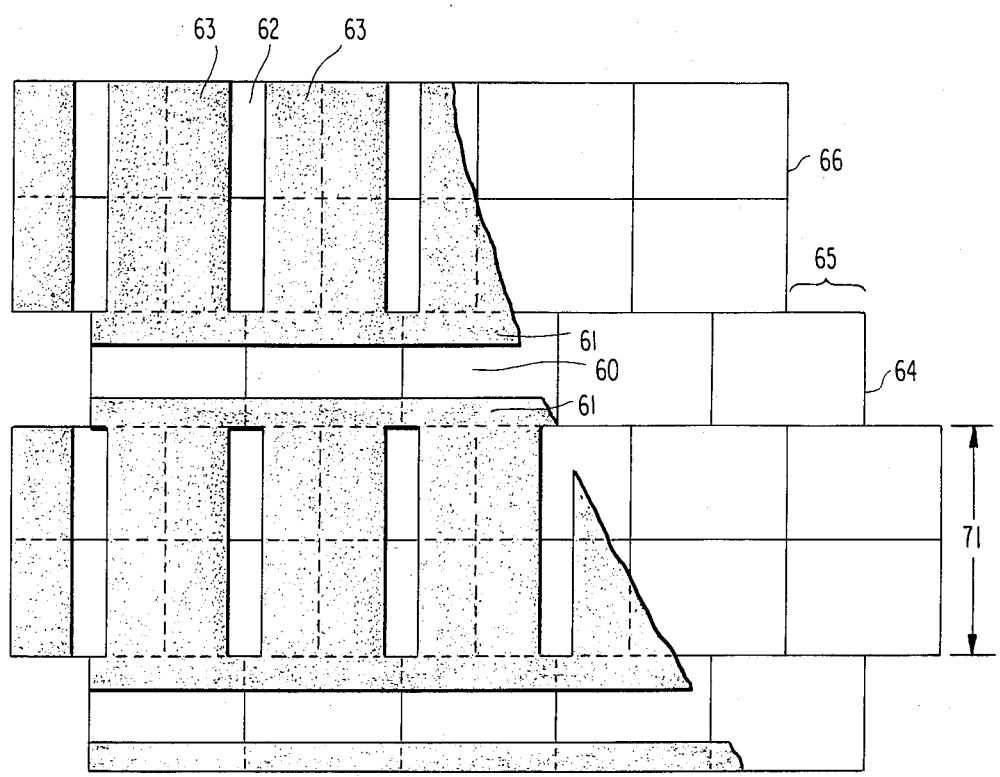
FIG. 3A is a fragmentary enlarged view of the input bar plate configuration shown in FIG. 3.

As best shown in the fragmentary enlarged view of the input bar plate shown in FIG. 3A, the rows of green light lenslets 64 are shifted to the right by a distance of one half the horizontal lenticular lens spacing, generally indicated by the dimension 65. This shift is necessary in order to provide the maximum efficiency for the green light. When the lenslets are shifted the one half space 65, the green lenslets 64 line up with the magenta bars 63. This half lenticule shift puts the green light which is diffracted vertically into the middle of a magenta slot in the complementary output bar plate 30 as depicted in FIG. 1. In this manner, all of the available green light is transmitted to the screen 33. Without this shift, available green light will be lost because of the diffraction of the green light onto a magenta output bar in plate 30.

In this invention the lenticular lens system 28 as well as the output bar plate 30 is conformed to the pattern of the input bar plate 18' shown in FIG. 3. The color plate 26 will also be configured to provide alternating strips of green and magenta light where the magenta strips may be, for example, two or more lenticular lens spacings wide, and the the green strips, one lenticular lens spacing wide. This configuration provides a more uniform color of illumination regardless of lens vignetting in the Schlieren and projection optics. In the conventional bar plate arrangement, the outer pupil will be vignetted in some image regions, leading to a change in green-magenta balance. With this invention, the colors are uniformly distributed throughout the input pupil, and any vignetting which occurrs will uniformly affect green and magenta by the same factor.

Figure 3B:
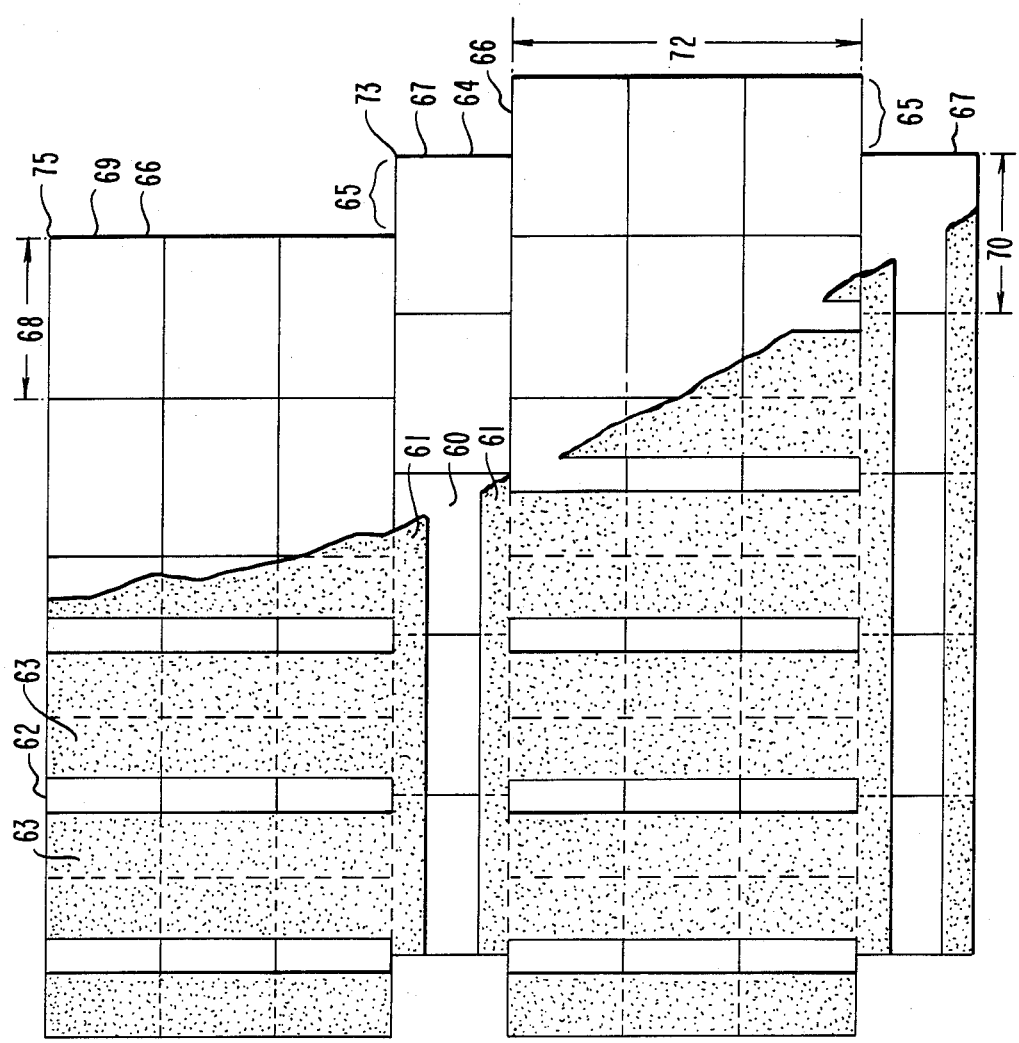
FIG. 3B is a fragmentary enlarged view of another embodiment of an input bar plate and lenticular lens system in accordance with the present invention.

Referring to FIG. 3B, a fragmentary enlarged view of another embodiment of an input bar plate and corresponding lenticular lens system of the present invention is shown. The lenticular lens system includes columns of a second array 69 of lenslets 66 periodically segmented along the column after every third lenslet 66 by a transversely extending row of lenslets 64 from a first array 67 of rows of lenslets 64. Lenslets 66 are equal in size to lenslets 64 and have the same aspect ratio with respect to each other. The columns of lenslets 66 of second array 69 are disposed orthogonal the rows of lenslets 64 of first array 67. A lenslet 64 includes an extent, or dimension, 70 disposed along, or in the direction of, the row of first array 67 and a lenslet 66 includes an extent, or dimension, 68 disposed along, or in the direction of the row of first array 67. Lenslets 66 are arranged to have a homothetic, that is, similar and similarly placed, orientation with respect to lenslets 64. Further, lenslets 64 are shifted or offset a distance 65 from an end point 75 of extent 68 with respect to an end point 73 of extent 70. Distance 65 is equal to one-half the extent 70 of lenslet 64 along a row of first array 67. Because lenslets 64 and 66 are the same size and have a homothetic orientation, the extent 68 of a lenslet 66 along a row of first array 67 is the same as the dimension 70 of a lenslet 64 along a row of first array 67 and offset dimension 65 is the same, or uniform, for all lenslets 64.

A column, or magenta, slot 62 is aligned with a corresponding column of lenslets 66 and extends the length of the height of three lenslets 66 along, or in the direction of, the column. Column, or magenta, bars 63 associated with each slot 62 are disposed on opposite sides of slot 62 and have the same columnar extent as slot 62. The associated magenta bars are also aligned and with the corresponding column of lenslets 66. Row, or green, slot 60 and associated row, or green, bars 61 are aligned with a corresponding row of lenslets 64 and extend the length of the row. Since lenslets 64 and 66 are of equal size, a 25 percent green to 75 percent magenta ratio is realized by magenta slots 62 and associated magenta bars 63 that are separated at every third lenticular lens spacing by a single transversely extending green slot 60 and associated green bars 61.

While the invention has been described in terms of the preferred embodiment, those skilled in the art will recognize that changes and modifications can be made without departing from the spirit and scope of the invention as defined in the appended claims.

We claim:

1. A light valve projector of the Schlieren dark field type having improved input and corresponding output bar plate systems wherein the optical input pupil comprises:

a lenticular lens system including a first array of lenslets arranged in rows and a second array of lenslets arranged in columns, the columns disposed orthogonal the rows, wherein the columns of lenslets are periodically interrupted by a respective row of lenslets for segmenting the columns of lenslets and further wherein proximate rows of lenslets are separated by segments of the columns of lenslets, the lenslets of the first array having a first predetermined dimension along the direction of the row and the lenslets of the second array having a second predetermined dimension along the direction of the row wherein the first and second predetermined dimensions are equal, said first array of lenslets in said rows being displaced along the direction of the row a predetermined distance from a predetermined end point of the second predetermined dimension with respect to a predetermined end point of the first predetermined dimension, wherein the predetermined distance is equal to one half the first predetermined dimension;

an input bar plate having row slots and associated row bars and column slots and associated column bars, the row slots and associated row bars disposed orthogonal the column slots and associated column bars, and the row slots and associated row bars aligned with said first array of lenslets, and further the column slots and associated column bars aligned with said second array of lenslets, in which said row slots and associated row bars are continuous and spaced apart transverse the column slots and associated column bars which are discontinuous for accommodating the row slots and associated row bars; and light filtering means for passing one color through the row slots and another color through the column slots.

2. The light valve projector of claim 1 wherein said filtering means passes green light through the row slots and magenta light through the column slots and the extent of each segment of the columns in the direction of the columns is the height of two lenslets.

3. The light valve projector of claim 1 wherein said filtering means passes green light through the row slots and magenta light through the column slots and the extent of each segment of the columns in the direction of the columns is the height of three lenslets.

4. The light valve projector of claim 1 further comprising an output bar plate having a complementary configuration to the slot arrangement of said input bar plate and wherein light passing through the row slots of said input bar plate is diffracted into the column slots in said output bar plate of said light valve projector.

* * * * *